United States Patent [19]

Matoba et al.

[11] Patent Number: 5,556,916
[45] Date of Patent: Sep. 17, 1996

[54] ANTISTATIC RESIN BLENDS COMPRISING ABS GRAFT COPOLYMERS AND ETHYLENE OXIDE COPOLYMERS

[75] Inventors: Yasuo Matoba, Amagasaki; Yasumi Shimizu, Kawanishi; Katsuhito Miura, Amagasaki; Sojiro Kitano, Osaka; Takahiro Sakashita, Osaka; Hidekazu Tanaka, Amagasaki, all of Japan

[73] Assignee: Daiso Co. Ltd., Osaka, Japan

[21] Appl. No.: 336,200

[22] Filed: Nov. 4, 1994

Related U.S. Application Data

[63] Continuation-in-part of Ser. No. 216,437, Mar. 23, 1994, abandoned, which is a continuation of Ser. No. 719, Jan. 5, 1993, abandoned.

[51] Int. Cl.⁶ .......................... C08L 55/02; C08L 71/02; C08L 71/03
[52] U.S. Cl. .......................... 525/64; 525/187; 525/404; 525/932; 524/910
[58] Field of Search .................. 524/910; 525/64, 525/187, 407, 932, 404

[56] References Cited

U.S. PATENT DOCUMENTS

| | | | |
|---|---|---|---|
| 3,976,721 | 8/1976 | Satake | 525/243 |
| 5,010,139 | 4/1991 | Yu | 525/64 |
| 5,147,959 | 9/1992 | Nishimoto | 528/48 |

*Primary Examiner*—D. R. Wilson
*Attorney, Agent, or Firm*—Armstrong, Westerman, Hattori, McLeland & Naughton

[57] ABSTRACT

A resin composition is provided which comprises a mixture of A) 100 parts by weight of an ABS graft copolymer comprising as component monomers an acrylonitrile compound and a vinyl aromatic compound in a weight ratio of 10:90 to 50:50, and B) 5 to 30 parts by weight of an ethylene oxide copolymer comprising ethylene oxide as a first monomer and a second monomer and containing at least 50 wt. % of ethylene oxide, the ethylene oxide copolymer having a refractive index ($n_D^{20}$) of at least 1.50, wherein said second monomer has a refractive index of at least 1.54 and is 2-phenylphenyl glycidyl ether or 1-naphthyl glycidyl ether, and wherein the molecular weight of the ethylene oxide copolymer is 1 to 5 in terms of a reduced viscosity as measured at 80° C. using 0.1 g/dl monochlorobenzene solution thereof.

15 Claims, 1 Drawing Sheet

ANTISTATIC RESIN BLENDS COMPRISING ABS GRAFT COPOLYMERS AND ETHYLENE OXIDE COPOLYMERS

This is a continuation-in-part of application Ser. No. 08/216,437, filed Mar. 23, 1994 abandoned, which is a continuation of application Ser. No. 08/000,719, filed Jan. 5, 1993, now abandoned.

BACKGROUND OF THE INVENTION

1. Field of the Invention

The present invention relates to antistatic resin compositions having an excellent permanent antistatic property and adapted for use in injection molding for preparing moldings having an improved surface appearance.

2. Description of the Prior Art

ABS graft copolymers have excellent mechanical characteristics and are therefore used in a wide variety of fields, whereas these copolymers are not antistatic and have accordingly found limited application to office automation devices and dustproof uses wherein troubles due to static electricity are to be precluded.

Antistatic properties are imparted to ABS graft copolymers, for example, by coating the surface of the resin with surfactants or the like or by incorporating surfactants into the resin by kneading, but these methods still remain to be improved in the durability of antistatic effect. Articles of such resin become impaired in the durability especially when washed with water.

To overcome this drawback, it has been proposed to admix an epihalohydrin copolymer with the graft copolymer (U.S. Pat. Nos. 4,588,773, 4,719,263 and 4,775,716), to admix an ethylene oxide copolymer with the graft copolymer (E.P. No. 287,092A2), to add an acrylate polymer to the graft copolymer as a third component (E.P. No. 294,722A2) and to add a specific modified vinyl polymer to the graft copolymer (Unexamined Japanese Patent Publication No. 269147/1990). Although affording improved permanent antistatic properties, these methods are found to have the problem that the product obtained by injection molding has faults in the appearance of its surface, such as weld lines and pearl gloss. This problem reduces the commercial value of ABS resins which are generally used for the housings of office automation devices and household electric devices, interior finishing materials, etc. of which an esthetic appearance is required and which are often produced by injection molding, consequently limiting the use of the resin.

The main object of the present invention is to provide antistatic resin compositions for injection molding which comprise as their base an ABS resin giving an excellent surface appearance.

SUMMARY OF THE INVENTION

We have conducted intensive research to solve the foregoing problems and found that the above object can be fully achieved by admixing with an ABS resin an ethylene oxide copolymer containing at least 50% of ethylene oxide as a component monomer and having a refractive index ($n_D^{20}$) of at least 1.50, whereby the present invention has been accomplished.

More specifically, the present invention provides an antistatic resin composition for preparing by injection molding molded products having an excellent surface appearance, the composition being characterized in that the composition comprises (A) 100 parts by weight of an ABS graft copolymer comprising as component monomers an acrylonitrile compound and a vinyl aromatic compound in a weight ratio of 10:90 to 50:50, and (B) 5 to 30 parts by weight of an ethylene oxide copolymer admixed with the ABS graft copolymer and containing at least 50 wt. % of ethylene oxide as a component monomer, the ethylene oxide copolymer having a refractive index ($n_D^{20}$) of at least 1.50.

The resin composition of the invention has an excellent antistatic property, gives moldings having a remarkably improved surface appearance and has a great industrial value.

DETAILED DESCRIPTION OF THE INVENTION

Figure 1:
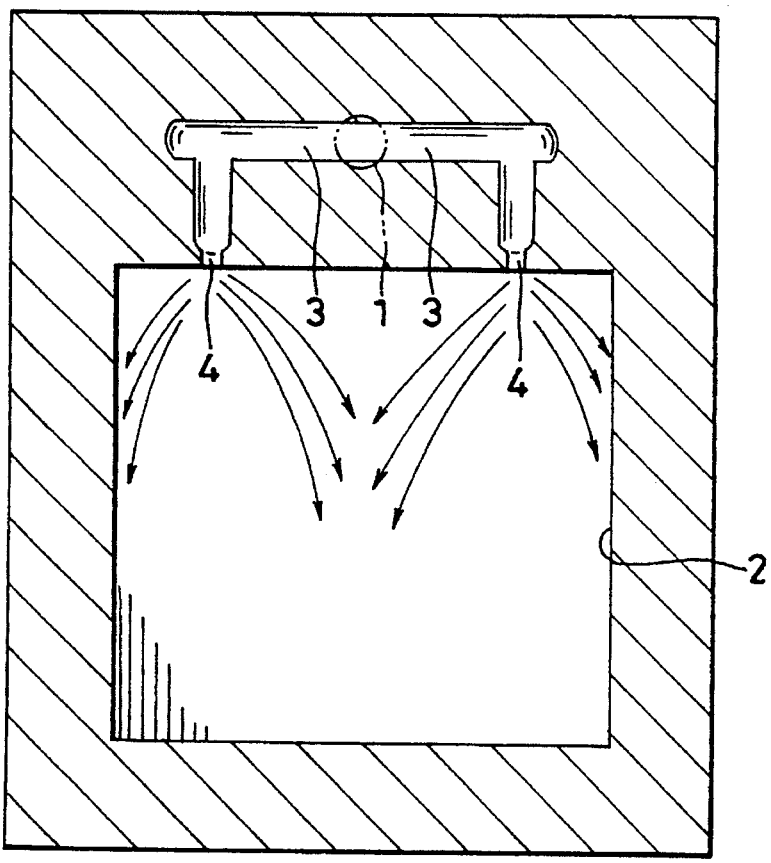
FIG. 1 is a sectional view of a mold.

The ABS graft copolymer to be used in the present invention comprises at least 40 wt. % of the combination of a vinyl aromatic compound and an acrylo-nitrile compound, and up to 60 wt. % of a rubber substrate.

Although the term "ABS" refers originally to a copolymer composed primarily of acrylonitrile, butadiene and styrene, this definition has been expanded in recent years to include copolymers in which these components have been replaced wholly or partially by closely analogous compounds and which substantially exhibit the characteristics of the so-called ABS resin with respect to basic properties such as moldability, rigidity, gloss and heat resistance.

The vinyl aromatic compounds useful as monomers for preparing the ABS graft copolymer are various copolymerizable vinyl aromatic compounds including vinylanilines, styrene, alpha-methylstyrene and like vinyl aromatic compounds, chlorostyrene, dibromostyrene and like halogenated styrenes, vinyltoluene and like alkylstyrenes, etc. Mixtures of different vinyl aromatic compounds are also usable. Preferable among these are styrene, halogenated styrenes, alpha-methylstyrenes, alkylstyrenes and mixtures of such styrenes. In the most preferred mode of carrying out the invention, the graft copolymer contains at least a small amount of styrene.

Acrylonitrile compounds useful as other monomers for preparing the ABS graft copolymer are acrylonitrile, halogenated acrylonitriles, methacrylonitrile, ethacrylonitrile, alkylacrylonitrile derivatives, and derivatives of such compounds. Other non-nitrile acrylic compound, such as methyl methacrylate, ethacrylate or acrolein, may be present in the ABS graft copolymer in a relatively small amount of up to 20 wt. %, preferably up to 10 wt. %. It is suitable to use acrylonitrile and/or methacrylonitrile. Most suitably, the ABS graft copolymer contains acrylonitrile as the main acrylic compound and further contains a small amount of methacrylonitrile.

For the preparation of the ABS graft copolymer, the component monomers, i.e., acrylonitrile compound and vinyl aromatic compound, are used in a weight ratio ranging from 10:90 to 50:50. If the weight proportion of the acrylonitrile compound is less than this range, it becomes difficult to fulfill one of the objects of the invention, that is, to obtain injection-molded products having an excellent surface appearance. On the other hand, proportions exceeding this range are undesirable since the ABS graft copolymer then exhibits reduced flowability and lower thermal stability when the composition is to be molded. More preferably, the weight ratio ranges from 20:80 to 40:60.

Various known rubber substrates are usable as such for preparing the ABS graft copolymer. Preferred rubber substrates are those comprising a diene rubber. More preferred rubber substrates are polybutadiene rubbers and butadiene copolymer rubbers. Exemplary of such rubbers are copolymers of butadiene and up to 35% of a copolymerizable monomer, such as acrylonitrile, alkyl acrylate or alkyl methacrylate, or a vinyl aromatic monomer, such as styrene. Although not as desirable as diene rubbers, other rubber substrates are also usable. Examples of such substrates are acrylic rubbers derived from an alkyl acrylate homopolymer or copolymer, ethylene-propylene non-conjugated diene copolymer rubbers, semicrystalline or noncrystalline chlorinated polyethylene, etc.

To obtain a resin of improved properties, the graft copolymer of the invention may contain small amounts of known additives as added thereto during polymerization. Examples of useful additives are divinylbenzene, ethylene glycol dimethacrylate and like cross-linkable monomers.

Many of graft copolymers useful for the present invention are commercially available readily, or can be prepared by various known graft polymerization techniques.

For example, the copolymer can be prepared by copolymerizing an acrylonitrile monomer and a vinyl aromatic monomer with a rubber substrate which is obtained in advance. The specification of U.S. Pat. No. 3,238,275 discloses a typical process for preparing the traditional ABS graft copolymer from styrene and acrylonitrile. Also disclosed in the specification is a process for preparing an ABS resin wherein a graft copolymer having a high content of rubber substrate is admixed with a rigid copolymer prepared in advance, such as styrene-acrylonitrile copolymer (SAN), acrylonitrile-alpha-methylstyrene or styrene copolymer.

The proportions of vinyl aromatic compound, acrylonitrile compound and rubber substrate vary depending partly on the desired characteristics of the thermoplastic resin to be obtained. However, from the viewpoint of ensuring moldability, rigidity, impact resistance, gloss, heat resistance and like properties in good balance, the ABS graft copolymer comprises preferably at least 40 wt. % of the combination of a vinyl aromatic compound and an acrylonitrile compound, and up to 60 wt. % of a rubber substrate, more preferably at least 50 wt. % of the combination of vinyl aromatic compound and acrylonitrile compound, and up to 50 wt. % of the rubber substrate.

Also usable is a polymer blend comprising an ABS graft copolymer and other polymer substituted for a portion of the graft copolymer provided that the blend exhibits the characteristics of the ABS graft copolymer. Examples of preferred polymers for use in such blends are vinyl chloride polymer, styrene polymer, impact-resistant styrene polymer, methyl methacrylate polymer, polyurethane, polycarbonate, polyamide, polybutylene terephthalate and like polyesters, polyphenylene ether, polyglutarimide, chlorinated polyethylene, etc. The blend contains usually at least 30 wt. %, preferably at least 50 wt. %, of the ABS graft polymer.

The ethylene oxide copolymer to be admixed with the ABS graft copolymer contains at least 50 wt. %, preferably at least 65 wt. %, of ethylene oxide as a component monomer, whereby a resin composition having an excellent antistatic property can be obtained. The ethylene oxide is copolymerized with other specified monomer to give the resulting copolymer a refractive index ($n_D^{20}$) of at least 1.50, usually 1.50–1.60. Presence of this copolymer in the present resin composition gives a product of remarkably improved surface appearance when the composition is subjected to injection molding.

The expression "faults in the surface appearance of the product" as used herein refers to a so-called pearl gloss, and a weld line, i.e., a linear mark produced by the confluence of portions of the resin composition within the mold used for injection molding. ABS resins contain an aromatic group as the primary group and therefore have a relatively high refractive index of at least about 1.55 although this value varies with the copolymer composition thereof. It is well known that in the case where the ABS resin is used as admixed with other polymer, the two polymers are made approximate to each other in refractive index to the greatest possible extent to obtain a resin composition of high transparency. However, weld lines are likely to occur even when a resin composition containing a single resin is injection-molded. It is therefore totally unexpectable that a composition comprising a mixture of ABS resin and ethylene oxide copolymer, like the composition of the invention, ameliorate a faulty appearance due to weld lines owing to the fact that the two components are approximate in refractive index.

The component monomers constituting the ethylene oxide copolymer are ethylene oxide as a first monomer, and a second monomer having a refractive index ($n_D^{20}$) of at least 1.54, usually 1.55–1.70. The second monomer is selected from among the compounds represented by the following general formula.

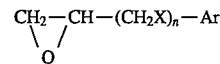

wherein Ar is a monocyclic aromatic group or heterocyclic aromatic group having a substituent selected from the group consisting of a halogen atom, aryl, aralkyl and a combination thereof, or a condensed aromatic group or heterocyclic aromatic group having or not having a substituent, n is an integer of 0 or 1, and X is O (oxygen), S (sulfur) or —O—CO—group.

More specific examples of such compounds are phenyl glycidyl ethers having phenyl substituted with a halogen atom, such as 2-chlorophenyl glycidyl ether, 4-chlorophenyl glycidyl ether, 2,4,6-trichlorophenyl glycidyl ether, 2,4-dibromophenyl glycidyl ether and 2,4-dibromocresyl glycidyl ether, phenyl glycidyl ethers wherein the phenyl is substituted with a substituent containing an aromatic group, such as 2-phenylphenyl glycidyl ether, 4-phenylphenyl glycidyl ether, 4-benzylphenyl glycidyl ether and 4-cumylphenyl glycidyl ether, aryl glycidyl ethers wherein the aryl is a condensed aromatic group, such as 1-naphthyl glycidyl ether, 2-naphthyl glycidyl ether and 9-phenanthryl glycidyl ether, aryl glycidyl ethers wherein the aryl is a condensed aromatic group substituted with a halogen atom, such as 4-chloro-1-naphthyl glycidyl ether, 2,4-dichloro-1-naphthyl glycidyl ether, 1-bromo-2-naphthyl glycidyl ether, 2-bromo-2-naphthyl glycidyl ether and 1,6-dibromo-2-naphthyl glycidyl ether, phenyl glycidyl thioethers such as 4-chlorophenyl glycidyl thioether and 2-chlorophenyl glycidyl thioether, styrene oxides wherein the phenyl is substituted with a halogen atom, such as 4-chorostyrene oxide, 2-chlorostyrene oxide, 2,6-dichlorostyrene oxide and 4-bromostyrene oxide, epoxides of condensed aromatic compounds substituted with vinyl, such as 2-vinylnaphthalene oxide and 9-vinylphenanthrene oxide, glycidyl ethers of condensed heterocyclic aromatic compounds such as 4-(2,3-epoxypropoxy)indole, glycidyl esters of benzoic acids substituted with a halogen atom, such as glycidyl-2-chlorobenzoate, glycidyl-3-chlorobenzoate, glycidyl-2,4-dichlorobenzoate, glycidyl-2,5-dichlorobenzoate, glycidyl-2-bromobenzoate and glycidyl-4-bromobenzoate, glycidyl esters of condensed aromatic carboxylic acids, such as glycidyl-1-napthoate and glycidyl-2-naphthoate, etc.

Beside the compounds of the general formula, also usable as a component monomer of the ethylene oxide copolymer is a condensed heterocyclic aromatic compound substituted with glycidyl, such as glycidyl carbazole, glycidyl indole or glycidyl phenothiazine.

As a component copolymerizable with ethylene oxide and the above monomer, other epoxy monomer, which is a third monomer, is usable in combination therewith when required insofar as the resulting copolymer contains at least 50 wt. % of ethylene oxide and has a refractive index ($n_D^{20}$) of at least 1.50. Examples of useful third monomers are propylene oxide, 1-butene oxide and like alkylene oxides, cyclohexene oxide, vinylcyclohexene monoxide and like cycloalkyl epoxides, styrene oxide, alpha-methylstyrene oxide and like aromatic substituted epoxides, epichlorohydrin, epibromohydrin and like halogen-substituted alkylene oxides, ethyl glycidyl ether, butyl glycidyl ether, chloroethyl glycidyl ether and like alkyl glycidyl ethers, allyl glycidyl ether and like alkenyl glycidyl ethers, phenyl glycidyl ether and like aromatic glycidyl ethers, glycidyl acetate, glycidyl propionate, glycidyl methacrylate, glycidyl benzoate and like glycidyl esters, etc.

The ethylene oxide copolymer for use in the present invention is prepared from at least 50 wt. % of ethylene oxide, the second monomer having a refractive index of at least 1.54, usually 1.55–1.70, and the third monomer which is used when required, by subjecting the combination of these compounds to ring opening polymerization.

The molecular weight of the ethylene oxide copolymer is preferably in the range of 0.5 to 10, more preferably 1 to 5, in terms of a reduced viscosity as measured at 80° C. using 0.1 g/dl monochlorobenzene solution. If the molecular weight is lower than this range, the composition of the invention exhibits impaired mechanical characteristics, whereas if it is higher than the range, the composition undesirably becomes lower in moldability, especially in flowability in the mold, and also remarkably in antistatic properties, although the composition is improved in weld lines.

The polymerization catalyst to be used can be any of those known, such as dialkylzinc-water, trialkylaluminum-water-acetylacetone, and thermal condensation product of an organotin compound and a phosphoric acid ester.

Examples of solvents useful for the copolymerization reaction are butane, pentane, hexane, heptane, benzene, toluene, chlorobenzene and the like. Alternatively, the reaction can be conducted in the absence of solvent.

The reaction temperature is preferably in the range of 0° to 60° C.

The copolymer may be any of block copolymer, graft copolymer, random copolymer and alternating copolymer, but is preferably a random copolymer to obtain excellent antistatic properties.

The ethylene oxide copolymer is used in the present invention in an amount of 5 to 30 parts by weight per 100 parts by weight of the ABS graft copolymer, whereby the objects of the invention can be fulfilled. If the amount is less than this range, it becomes difficult to obtain antistatic properties which is one of the objects of the invention, while amounts exceeding this range are undesirable since the mechanical characteristics inherent in the ABS resin then become impaired. The amount of the ethylene oxide copolymer is preferably 8 to 25 parts by weight per 100 parts by weight of the ABS graft copolymer. The ethylene oxide copolymer can be used as blended with ethylene oxide homopolymer or other ethylene oxide copolymer insofar as the characteristics contemplated by the present invention can be imparted to the resulting resin composition. To be suitable, the blend contains at least 30 wt. %, preferably at least 50 wt. %, of the ethylene oxide copolymer of the invention.

The resin composition of the present invention is obtained by mixing together the ABS graft copolymer and the ethylene oxide copolymer by one of various techniques, for example, by mixing in a Banbury mixer, mixing in a molten state, extrusion or pulverization in a mill.

The ethylene oxide copolymer and ABS graft copolymer to be used in the present invention can be partially replaced by such a component as is disclosed in Unexamined Japanese Patent Publication No. 269147/1990, i.e., a modified vinyl polymer having at least one functional group selected from among carboxyl, epoxy, amino, hydroxyl, polyalkylene oxide and derivatives thereof in such an amount that the characteristics of the ABS graft copolymer can be imparted to the resulting composition. Although the amount of the modified vinyl polymer selected is variable over a suitable range which is dependent on the properties thereof, usually at least 30 wt. %, preferably at least 50 wt. %, of the ABS graft copolymer should be present.

The present composition may have incorporated therein a small amount of dicumyl peroxide or like crosslinking agent although the crosslinking agent is not always necessary for suitable compositions. Also usable are other known additives including, for example, impact resistance improving agents, lubricants, stabilizers, fillers, antioxidants, ultraviolet absorbers and flame retardants. Further usable are known antistatic agents which include, for example, long-chain amines, ethers and esters; amides, quaternary ammonium salts and sulfonic acid; alkyl, aryl or alkylaryl sulfonates, phosphoric acid, alkyl, aryl or aralkyl phosphates, and low-molecular-weight polyether glycols. These additives may be added to the ethylene oxide copolymer and/or the ABS graft copolymer individually, to the ethylene oxide copolymer and the resin component when they are mixed together, or to the mixture.

The present invention will be described more specifically in detail with reference to the following examples.

Reference Example 1 a) Preparation of Polymerization Catalyst

A 37.6 g quantity of dibutyltin oxide and 80.3 g of tributyl phosphate were placed into a 1-liter four-necked flask equipped with a stirrer, nitrogen supply tube, low-boiling-point substance discharge tube and thermometer. The air in the flask was replaced by nitrogen, and the mixture was thereafter heated at 250° C. for 20 minutes with stirring to obtain a solid product for use as a polymerization catalyst.

b) Preparation of Ethylene Oxide Copolymer

Into a 20-liter stainless steel reactor equipped with a stirrer, nitrogen supply tube, thermometer and sample supply tube were placed in a nitrogen atmosphere 4200 g of hexane, 823 g of ethylene oxide, 282 g of 1-naphthyl glycidyl ether and 15 g of the catalyst prepared by the above procedure, which were then reacted at 20° C. for 8 hours with stirring. After the completion of reaction, 5 ml of water and 5.5 g of 4,4'-thiobis(3-methyl-6-tert-butylphenol) serving as an antioxidant were added to the reaction mixture, followed by stirring at room temperature for 15 minutes.

Subsequently, the polymer produced was collected by filtration, washed with hexane and thereafter dried at 50° C. overnight to obtain a copolymer (1060 g). The copolymer was found to be composed of ethylene oxide and 1-naphthyl glycidyl ether in a weight ratio of 75:25 by the NMR method. This polymer had a refractive index ($n_D^{20}$) of 1.508.

The molecular weight of copolymer is 4.0 in terms of a reduced viscosity as measured at 80° C. using 0.1 g/dl monochlorobenzene solution.

Reference Examples 2–7

Ethylene oxide copolymers were prepared in the same manner as in Reference Example 1. Tables 1 and 2 show the results.

TABLE 1

| Reference Example | 2 | 3 | 4 |
|---|---|---|---|
| Monomers used (g) | | | |
| Ethylene oxide | 772 | 823 | 623 |
| Epichlorohydrin | | 57 | 293 |
| 2,4-Dibromophenyl glycidyl ether | 345 | | |
| 2-Phenylphenyl glycidyl ether | | 279 | |
| Hexane (g) | 5100 | 4200 | 4200 |
| Catalyst[1] (g) | 18 | 15 | 18 |
| Reaction temperature (°C.) | 20 | 20 | 20 |
| Reaction time (hr) | 8 | 10 | 8 |
| Antioxidant[2] (g) | 5.5 | 5.5 | 5.0 |
| Yield (g) | 1060 | 1110 | 870 |
| Reduced viscosity[3] | 2.5 | 3.0 | 4.6 |
| Copolymer composition[4] (wt. %) | | | |
| Ethylene oxide | 69 | 75 | 70 |
| Epichlorohydrin | | 5 | 30 |
| 2,4-Dibromophenyl glycidyl ether | 31 | | |
| 2-Phenylphenyl glycidyl ether | | 20 | |
| Refractive index ($n_D^{20}$) of polymer | 1.517 | 1.502 | 1.474 |

Notes:
[1] Polymerization catalyst prepared in Ref. Ex. 1, a).
[2] 4,4'-Thiobis(3-methyl-6-tert-butylphenol).
[3] Measured with a monochlorobenzene solution of the copolymer (0.1 g/dl) at 80° C.
[4] Measured by NMR method for Ref. Ex. 2, by NMR method and from Cl content for Ref. Ex. 3, and from Cl content for Ref. Ex. 4.

TABLE 2

| Reference Example | 5 | 6 | 7 |
|---|---|---|---|
| Monomers used (g) | | | |
| Ethylene oxide | 823 | 415 | 615 |
| Propylene oxide | | | 445 |
| 2,4-Dibromophenyl glycidyl ether | 116 | 595 | |
| Hexane (g) | 4200 | 4200 | 5100 |
| Catalyst[1] (g) | 10 | 18 | 7 |
| Reaction temperature (°C.) | 20 | 25 | 20 |
| Reaction time (hr) | 6 | 10 | 10 |
| Antioxidant[2] (g) | 5.0 | 5.0 | 5.0 |
| Yield (g) | 910 | 929 | 1020 |
| Reduced viscosity[3] | 3.7 | 2.1 | 7.2 |
| Copolymer composition[4] (wt. %) | | | |
| Ethylene oxide | 88 | 45 | 60 |
| Propylene oxide | | | 40 |
| 2,4-Dibromophenyl glycidyl ether | 12 | 55 | |
| Refractive index ($n_D^{20}$) of polymer | 1.474 | 1.575 | 1.456 |

Notes:
[1] Polymerization catalyst prepared in Ref. Ex. 1, a).
[2] 4,4'-Thiobis(3-methyl-6-tert-butylphenol).
[3] Measured with a monochlorobenzene solution of the copolymer (0.1 g/dl) at 80° C.
[4] Measured by NMR method for Ref. Ex. 5, 6 and 7.

The ethylene oxide copolymers of Reference Examples 1, 2 and 3 are those adapted for use in the invention.

EXAMPLES 1, 2

Comparative Examples 1, 2

An ABS graft copolymer (I) comprising 30 wt. % of acrylonitrile, 55 wt. % of styrene and 15 wt. % of butadiene was prepared by the known emulsion polymerization process and graft polymerization process. Compositions were prepared by admixing with 100 parts by weight of the copolymer (I) 0.5 part by weight of ethylene-bis-stearamide serving as a lubricant and 0.5 part by weight of Phthalocyanine Blue as a pigment, or further admixing with the resulting composition 10 or 20 parts by weight of the ethylene oxide copolymer obtained in Reference Example 1, or 20 parts by weight of the copolymer obtained in Reference Example 4. Each of these compositions was pelletized and injection-molded by the following methods. Table 3 shows the surface appearance and physical properties of the moldings obtained.

Pelletization

The composition was kneaded in a Banbury mixer having a capacity of 1.7 liters, then made into a sheet with a twin roll having a surface temperature of 170° C., cooled and thereafter pelletized to about 4 mm cube by a pelletizer.

Injection molding

The pelletized composition was dried at 90° C. for 4 hours in a tray dryer and then subjected to injection molding. The molding machine used was All-rounder A170H (90–200), product of ARBURG CO., LTD.

The molding conditions were as follows.

Screw diameter: 22 mm

Cylinder temperature: 220° C.

Injection pressure: 2000 kg/cm$^2$

Injection time: 0.5 sec

Follow-up pressure: 1500 kg/cm$^2$

Dwell time: 7 sec

Mold temperature: 60° C.

Clamping force: 18 t

Cooling time: 10 sec

Mold

The mold has a cavity 2 in the form of a flat plate measuring 81 mm×87 mm×2 mm (thickness), and two runners (4 mm in inside diameter) 3 branching from a sprue (5 mm in the diameter of its base portion) 1 as shown in FIG. 1. The resin is filled into the cavity 2 through two gates 4.

Gate land 2 mm, width 2 mm, thickness 1 mm. Spacing between the gates 51 mm.

Figure 2:
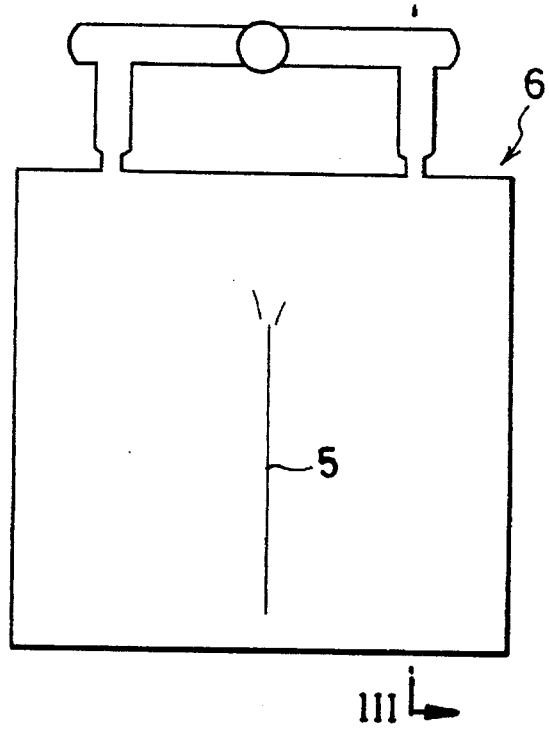
FIG. 2 is a plan view of a test piece.
Figure 3:
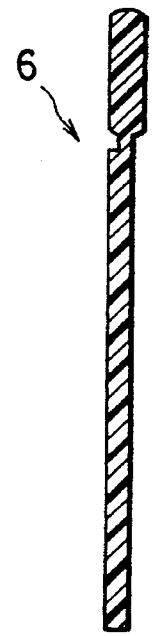
FIG. 3 is a view in section taken along the line III—III in FIG. 2.

FIGS. 2 and 3 show a test piece 6 produced by injection molding with use of the mold. The mold is so designed that a weld line 5 occurs approximately centrally of the flat platelike test piece 6.

Surface appearance

The test piece was checked for a weld line and pearl gloss with the eye. The results are represented by symbols.

Physical properties

Antistatic properties

Charge decay rate (sec): A 10 KV charge was applied to the test piece, and the time this charge took to decay to one-half was determined, using an honest meter (product of Shishido Seidenki Co., Ltd.). Surface resistivity (ohms): Determined according to JIS K 6911 at 23° C., 50% RH.

Mechanical characteristics

Stress at yield (kg/cm$^2$): ASTM D-638, 50 mm/min.
Elongation at breakage (%): ASTM D-638, 50 mm/min.
Izod impact strength (kg cm/cm): ASTM D-256-56A (with ½ in. notch).
Flexural modulus (kg/cm$^2$): ASTM D-790.

mer (II) (comprising 5 wt. % of acrylonitrile, 15 wt. % of butadiene and 80 wt. % of styrene) prepared by the known emulsion polymerization process. The compositions were molded and tested in the same manner as in Example 1. Table 4 shows the results.

TABLE 3

|  | Example 1 | Example 2 | Comp. Ex. 1 | Comp. Ex. 2 |
| --- | --- | --- | --- | --- |
| Composition (parts by weight) | | | | |
| ABS graft copolymer (I) | 100 | 100 | 100 | 100 |
| Copolymer of Ref. Ex. 1 | 10 | 20 | | |
| Copolymer of Ref. Ex. 4 | | | | 20 |
| Ethylene-bis-stearamide | 0.5 | 0.5 | 0.5 | 0.5 |
| Phthalocyanine Blue | 0.5 | 0.5 | 0.5 | 0.5 |
| Surface Appearance[1)] | | | | |
| Weld line | A–B | B | A–B | D |
| Pearl gloss | B | B | A | D |
| Physical properties | | | | |
| Antistatic properties | | | | |
| Charge decay rate (sec) | 2.5 | 1.0 | >60 | 1.5 |
| Surface resistivity (ohms) | $8 \times 10^{12}$ | $9 \times 10^{11}$ | $>1 \times 10^{18}$ | $2 \times 10^{12}$ |
| Mechanical characteristics | | | | |
| Stress at yield (kg/cm$^2$) | 420 | 385 | 470 | 390 |
| Elongation at breakage (%) | 9 | 6 | 11 | 5 |
| Izod impact strength (kg · cm/cm) | 15 | 15 | 13 | 15 |
| Flexural modulus (kg/cm$^2$) | 23000 | 18000 | 28000 | 18000 |

Note[1)]Criteria of evaluation: A none, B slight or partial, C noticeable, D markedly noticeable.

EXAMPLES 3, 4

Comparative Examples 3–6

Compositions were prepared by admixing 0.5 part by weight of ethylene-bis-stearamide as a lubricant, 0.5 part by weight of Phthalocyanine Blue as a pigment and the copolymer prepared in Reference Example 1, 2, 5, 6 or 7 with 100 parts by weight of combined amount of the ABS graft copolymer (I) used in Example 1 and an ABS graft copoly-

TABLE 4

|  | Example 3 | Example 4 | Comp. Ex. 3 | Comp. Ex. 4 | Comp. Ex. 5 | Comp. Ex. 6 |
| --- | --- | --- | --- | --- | --- | --- |
| Composition (parts by weight) | | | | | | |
| ABS graft copolymer (I) | 50 | 50 | | 50 | 50 | 50 |
| ABS graft copolymer (II) | 50 | 50 | 100 | 50 | 50 | 50 |
| Copolymer of Ref. Ex. 1 | 15 | | 15 | | | |
| Copolymer of Ref. Ex. 2 | | 15 | | | | |
| Copolymer of Ref. Ex. 5 | | | | 15 | | |
| Copolymer of Ref. Ex. 6 | | | | | 15 | |
| Copolymer of Ref. Ex. 7 | | | | | | 15 |
| Ethylene-bis-stearamide | 0.5 | 0.5 | 0.5 | 0.5 | 0.5 | 0.5 |

TABLE 4-continued

|  | Example 3 | Example 4 | Comp. Ex. 3 | Comp. Ex. 4 | Comp. Ex. 5 | Comp. Ex. 6 |
|---|---|---|---|---|---|---|
| Phthalocyanine Blue | 0.5 | 0.5 | 0.5 | 0.5 | 0.5 | 0.5 |
| Surface appearance[1)] | | | | | | |
| Weld line | B | B | C | C–D | B–A | D |
| Pearl gloss | B | B | C | C–D | B–A | D |
| Physical properties | | | | | | |
| Antistatic properties | | | | | | |
| Charge decay rate (sec) | 1.8 | 2.4 | 1.9 | 1.5 | 22.6 | 1.5 |
| Surface resistivity (ohms) | $3 \times 10^{12}$ | $7 \times 10^{12}$ | $7 \times 10^{12}$ | $2 \times 10^{12}$ | $2 \times 10^{14}$ | $3 \times 10^{12}$ |
| Mechanical characteristics | | | | | | |
| Stress at yield (kg/cm$^2$) | 360 | 365 | 340 | 370 | 350 | 360 |
| Elongation at breakage (%) | 5 | 6 | 4 | 4 | 7 | 5 |
| Izod impact strength (kg · cm/cm) | 14 | 14 | 13 | 13 | 15 | 13 |
| Flexural modulus (kg/cm$^2$) | 18000 | 19000 | 17000 | 19000 | 19000 | 18000 |

Note[1)]Criteria of evaluation: A none, B slight or partial, C noticeable, D markedly noticeable.

Examples 5, 6

Comparative Examples 7–9

Compositions were prepared by admixing 0.5 part by weight of ethylene-bis-stearamide as a lubricant, 0.5 part by weight of Phthalocyanine Blue as a pigment, 0.5 part by weight of dibutyltin maleate as a stabilizer and the copolymer prepared in Reference Example 3 with 90 parts by weight of the same copolymer as the ABS graft copolymer (I) used in Example 1 and 10 parts by weight of polyvinyl chloride having a polymerization degree of 800.

and thereafter dried at 50° C. overnight to obtain a copolymer(970 g).

The copolymer was found to be composed of ethylene oxide and 1-naphthyl glycidyl ether in a weight ratio of 75:25 by the NMR method. The molecular weight of copolymer is 13 in terms of a reduced viscosity as measured at 80° C. using 0.1 g/dl monochlorobenzene solution.

Reference Examples 9

2-Phenylphenyl glycidyl ether-epichlorohydrin-ethylene oxide copolymers was prepared in the same manner as in

TABLE 5

|  | Example 5 | Example 6 | Comp. Ex. 7 | Comp. Ex. 8 | Comp. Ex. 9 |
|---|---|---|---|---|---|
| Composition (parts by weight) | | | | | |
| ABS graft copolymer (I) | 90 | 90 | 90 | 90 | 90 |
| Polyvinyl chloride | 10 | 10 | 10 | 10 | 10 |
| Copolymer of Ref. Ex. 3 | 10 | 20 | | 3 | 40 |
| Ethylene-bis-stearamide | 0.5 | 0.5 | 0.5 | 0.5 | 0.5 |
| Phthalocyanine Blue | 0.5 | 0.5 | 0.5 | 0.5 | 0.5 |
| Dibutyltin maleate | 0.5 | 0.5 | 0.5 | 0.5 | 0.5 |
| Surface appearance[1)] | | | | | |
| Weld line | B | B | A–B | A–B | B |
| Pearl gloss | B | B | A | A–B | B |
| Physical properties | | | | | |
| Antistatic properties | | | | | |
| Charge decay rate (sec) | 2.1 | 0.9 | >60 | >60 | 0.2 |
| Surface resistivity (ohms) | $7 \times 10^{12}$ | $2 \times 10^{12}$ | $>1 \times 10^{16}$ | $9 \times 10^{14}$ | $4 \times 10^{10}$ |
| Mechanical characteristics | | | | | |
| Stress at yield (kg/cm$^2$) | 410 | 370 | 450 | 430 | 140 |
| Elongation at breakage (%) | 15 | 15 | 16 | 15 | 210 |
| Izod impact strength (kg · cm/cm) | 13 | 14 | 13 | 13 | 19 |
| Flexural modulus (kg/cm$^2$) | 22500 | 18000 | 27000 | 26000 | 1100 |

Note[1)]Criteria of evaluation: A none, B slight or partial, C noticeable D markedly noticeable.

Reference Examples 8

1-naphthyl glycidyl ether-ethylene oxide copolymers was prepared in the same manner as in Reference Example 1, except that the amount of the catalyst was changed to 8 g, the polymerization temperature was changed to 0° C. and the polymerization time was changed to 30 hours. The polymer produced was collected by filtration, washed with hexane Reference Example 3, except that the amount of the catalyst was changed to 8 g, the polymerization temperature was changed to 0° C. and the polymerization time was changed to 30 hours.

The polymer produced was collected by filtration, washed with hexane and thereafter dried at 50° C. overnight to obtain a copolymer(1,050 g).

The copolymer was found to be composed of ethylene oxide, epichlorohydrin and 2-phenylphenyl glycidyl ether in a weight ratio of 75:5:20 by the NMR method. The molecular weight of copolymer is 17 in terms of a reduced viscosity as measured at 80° C. using 0.1 g/dl monochlorobenzene solution.

Comparative Examples 10, 11 and 12

Compositions were prepared in the same manner as in Example 1, 2 and 3, except that 1-naphthyl glycidyl ether-ethylene oxide copolymer prepared in Reference Example 8 was used instead of the copolymer of Reference Example 1, respectively. The compositions were molded and tested in the same manner as in Example 1. Table 6 shows the results.

Comparative Examples 13 and 14

Compositions were prepared in the same manner as in Example 5 and 6, except that 2-phenylphenyl glycidyl-ether epichlorohydrin-ethylene oxide copolymer prepared in Reference Example 9 was used instead of the copolymer of Reference Example 3, respectively. The compositions were molded and tested in the same manner as in Example 1. Table 6 shows the results.

EXAMPLE 7

Comparative Example 15

Compositions were prepared in the same manner as in Example 1 except that 15 parts by weight of 2-phenylphenyl glycidyl-ether epichlorohydrin-ethylene oxide copolymer prepared in Reference Example 3, and 15 parts of weight of 2-phenylphenyl glycidyl-ether epichlorohydrin-ethylene oxide copolymer prepared in Reference Example 9 was used as copolymer, respectively. The compositions were molded and tested in the same manner as in Example 1. Table 7 shows the results.

TABLE 6

| | Comp. Ex. 10 | Comp. Ex. 11 | Comp. Ex. 12 | Comp. Ex. 13 | Comp. Ex. 14 |
|---|---|---|---|---|---|
| Composition (parts by weight) | | | | | |
| ABS graft copolymer (I) | 100 | 100 | 50 | 90 | 90 |
| ABS graft copolymer (II) | | | 50 | | |
| Polyvinyl chloride | | | | 10 | 10 |
| 1-naphthyl glycidyl ether-ethylene oxide copolymer produced in Ref. Ex.8 | 10 | 20 | 15 | | |
| 2-phenylpheny glycidyl ether-epichlorohydrin-ethylene oxide copolymer produced in Ref. Ex. 9 | | | | 10 | 20 |
| Ethylene-bis-stearamide | 0.5 | 0.5 | 0.5 | 0.5 | 0.5 |
| Phthalocyanine blue | 0.5 | 0.5 | 0.5 | 0.5 | 0.5 |
| Dibutyltin maleate | | | | 0.5 | 0.5 |
| Surface Appearance[1)] | | | | | |
| Weld line | A–B | B | B | B | B |
| Pearl gloss | no gloss | no gloss | no gloss | no gloss | no gloss |
| Physical properties | | | | | |
| Antistatic properties | | | | | |
| Change decay rate(sec.) | >60 | >60 | >60 | >60 | >60 |
| Surface resistivity (ohms.) | $7 \times 10^5$ | $1 \times 10^{15}$ | $2 \times 10^{15}$ | $5 \times 10^{15}$ | $2 \times 10^{15}$ |
| Mechanical characteristics | | | | | |
| Stress at yield (kg/cm$^2$) | 440 | 400 | 380 | 410 | 380 |
| Elongation at breakage (%) | 7 | 5 | 5 | 14 | 14 |
| Izod impact strength (kg · cm/cm) | 13 | 13 | 13 | 14 | 14 |
| Flexural modulus (kg/cm$^2$) | 26000 | 24000 | 19000 | 23000 | 20000 |

Note[1)]Criteria of evaluation A; none, B; slight or partial

TABLE 7

| | Example 7 | Comp. Ex. 15 |
|---|---|---|
| Composition (parts by weight) | | |
| ABS graft copolymer (I) | 100 | 100 |
| 2-phenylphenyl glycidylether-epichlorohydrin-ethylene oxide copolymer produced in Ref. Ex. 3 | 15 | |
| 2-phenylphenyl glycidylether-epichlorohydrin-ethylene oxide copolymer produced in Ref. Ex. 9 | | |
| Ethylene-bis-stearamide | 0.5 | 0.5 |
| Phthalocyanine blue | 0.5 | 0.5 |
| Surface Appearance[1)] | | |
| Weld line | A–B | A–B |
| Pearl gloss | B | no gloss |
| Physical properties | | |
| Antistatic properties | | |
| Change decay rate (sec.) | 1.0 | >60 |

TABLE 7-continued

|  | Example 7 | Comp. Ex. 15 |
| --- | --- | --- |
| Surface resistivity (ohms.) | $1 \times 10^{12}$ | $2 \times 10^{15}$ |
| Mechanical characteristics |  |  |
| Stress at yield (kg/cm$^2$) | 410 | 450 |
| Elongation at breakage (%) | 7 | 4 |
| Izod impact strength (kg · cm/cm) | 14 | 14 |
| Flexural modulus(kg/cm$^2$) | 22000 | 24000 |

Note[1]Criteria of evaluation A; none, B; slight or partial

As shown by Tables 6 and 7, the composition containing 2-phenylphenyl glycidyl ether or 1-naphthyl glycidyl ether, and wherein the molecular weight of the ethylene oxide copolymer is 0.5 to 10 in terms of a reduced viscosity as measured at 80° C. using 0.1 g/dl monochlorobenzene solution thereof, exhibits remarkable antistatic properties. If the molecular weight is lower than this range, the composition exhibits impaired mechanical characteristics, whereas if it is higher than the range, the composition undesirably becomes lower in moldability, especially in flowability in the mold, so that gloss is lowered, and it also becomes lower remarkably in antistatic properties, although the composition is improved in weld lines. Accordingly, it is difficult to improve antistatic properties and weld line at the same time.

What we claim is:

1. An antistatic resin composition comprising a mixture of:

100 parts by weight of an ABS graft copolymer comprising as component monomers an acrylonitrile compound and a vinyl aromatic compound in a weight ratio of 10:90 to 50:50;

5 to 30 parts by weight of an ethylene oxide copolymer containing at least 50 wt. % of ethylene oxide and additionally 2-phenylphenyl glycidyl ether or 1-naphthylglycidyl ether, said copolymer having a refractive index ($n_d^{20}$) of at least 1.50 and a reduced viscosity, 0.1 g/dl solution in chlorobenzene at 80° C., of 1 to 5.

2. A composition as defined in claim 1, wherein the ethylene oxide copolymer is present in an amount of 8 to 25 parts by weight per 100 parts by weight of the ABS graft copolymer.

3. A resin composition as defined in claim 1, wherein the ABS graft copolymer comprises at least 40 wt. % of the vinyl aromatic compound and the acrylonitrile compound, and up to 60 wt. % of a rubber substrate.

4. A composition as defined in claim 1, wherein the weight ration of the acrylonitrile compound to the vinyl aromatic compound is 20:80 to 40:60.

5. A composition as defined in claim 1, wherein the acrylonitrile compound is acrylonitrile, a halogenated acrylonitrile, methacrylonitrile, ethacrylonitrile or an alkylacrylonitrile.

6. A composition as defined in claim 1, wherein the vinyl aromatic compound is a vinylaniline, styrene, alphamethylstyrene, a halogenated styrene or an alkylstyrene.

7. A composition as defined in claim 3, wherein the rubber substrate is a butadiene rubber; a copolymer of butadiene and acrylonitrile, and an alkyl acrylate, alkyl methacrylate or vinyl aromatic monomer; an acrylic rubber derived from an alkyl acrylate homopolymer or copolymer; an ethylene-propylene non-conjugated diene copolymer rubber; or a semicrystalline or noncrystalline chlorinated polyethylene.

8. A composition as defined in claim 1, wherein the ethylene oxide copolymer comprises an additional epoxide-containing monomer.

9. A composition as defined in claim 8, wherein the additional epoxide containing monomer is an alkylene oxide; a cycloalkyl epoxide; an aromatic substituted epoxide; a halogen-substituted alkylene oxide; an alkyl glycidyl ether; an alkenyl glycidyl ether; an aromatic glycidyl ether; or a glycidyl ester.

10. A composition as defined in claim 9, wherein the alkylene oxide is propylene oxide or 1-butene oxide.

11. A composition as defined in claim 9, wherein the aromatic substituted epoxide is styrene oxide or alphamethylstyrene oxide.

12. A composition as defined in claim 9, wherein the halogen-substituted alkylene oxide is epichlorohydrin or epibromohydrin.

13. A composition as defined in claim 9, wherein the alkenyl glycidyl ether is allyl glycidyl ether.

14. A composition as defined in claim 9, wherein the aromatic glycidyl ether is phenyl glycidyl ether.

15. A composition as defined in claim 9, wherein the glycidyl ester is glycidyl acetate, glycidyl propionate, glycidyl methacrylate or glycidyl benzoate.

\* \* \* \* \*